J. W. NICHOLS.
CAN SEAMING MACHINE.
APPLICATION FILED JAN. 30, 1913.

1,096,937.

Patented May 19, 1914.
9 SHEETS—SHEET 1.

J. W. NICHOLS.
CAN SEAMING MACHINE.
APPLICATION FILED JAN. 30, 1913.

1,096,937.

Patented May 19, 1914.

9 SHEETS—SHEET 2.

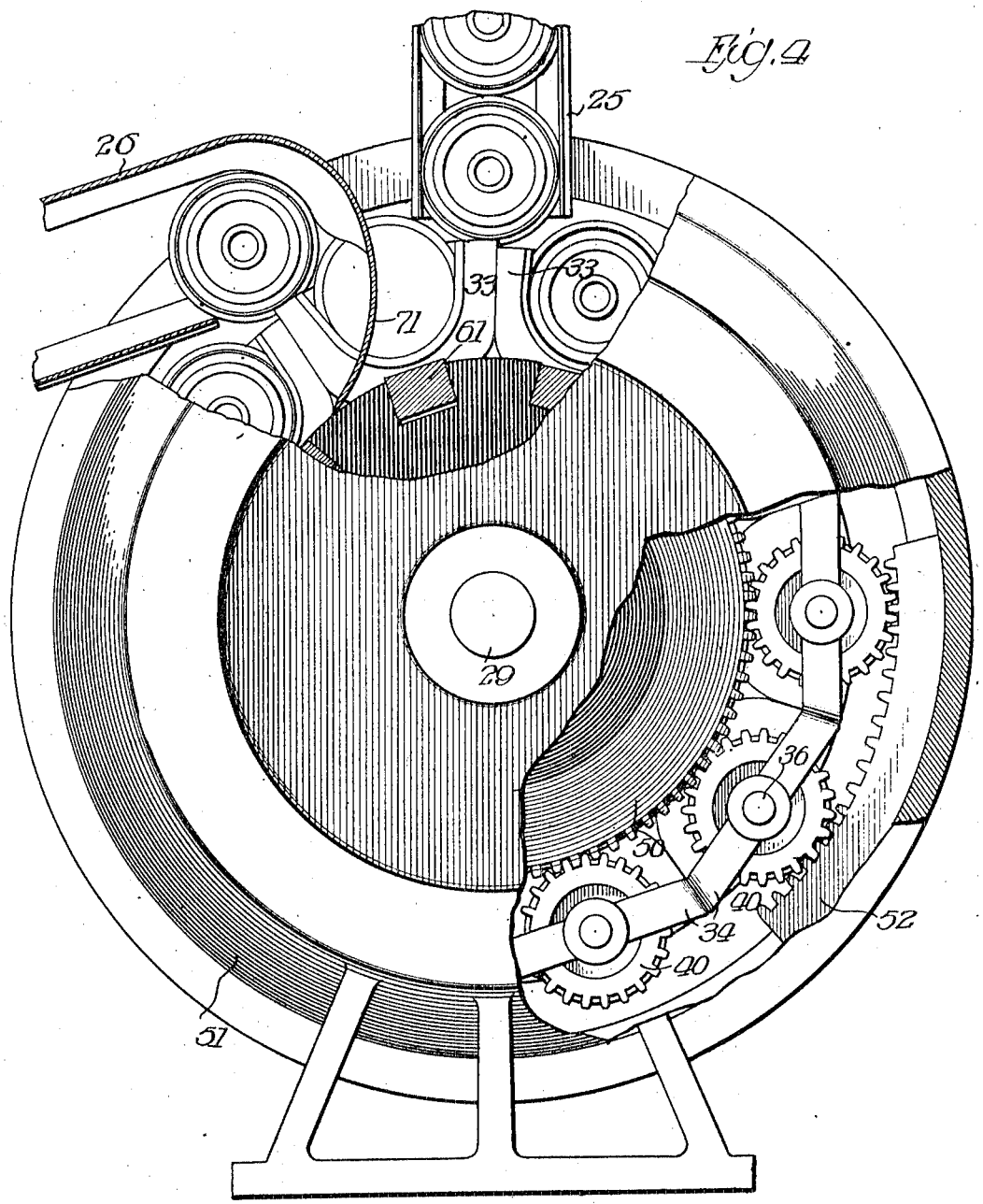

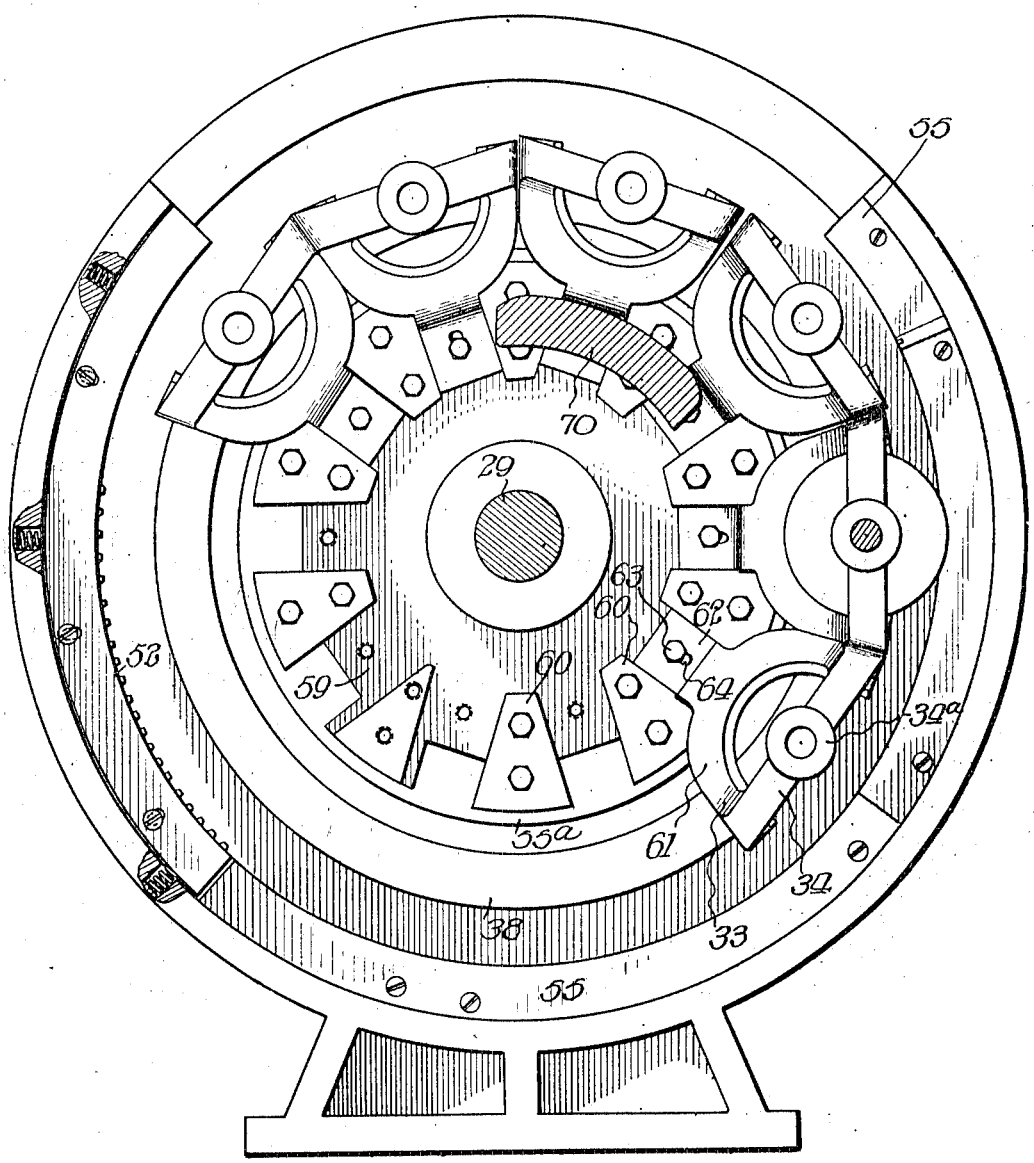

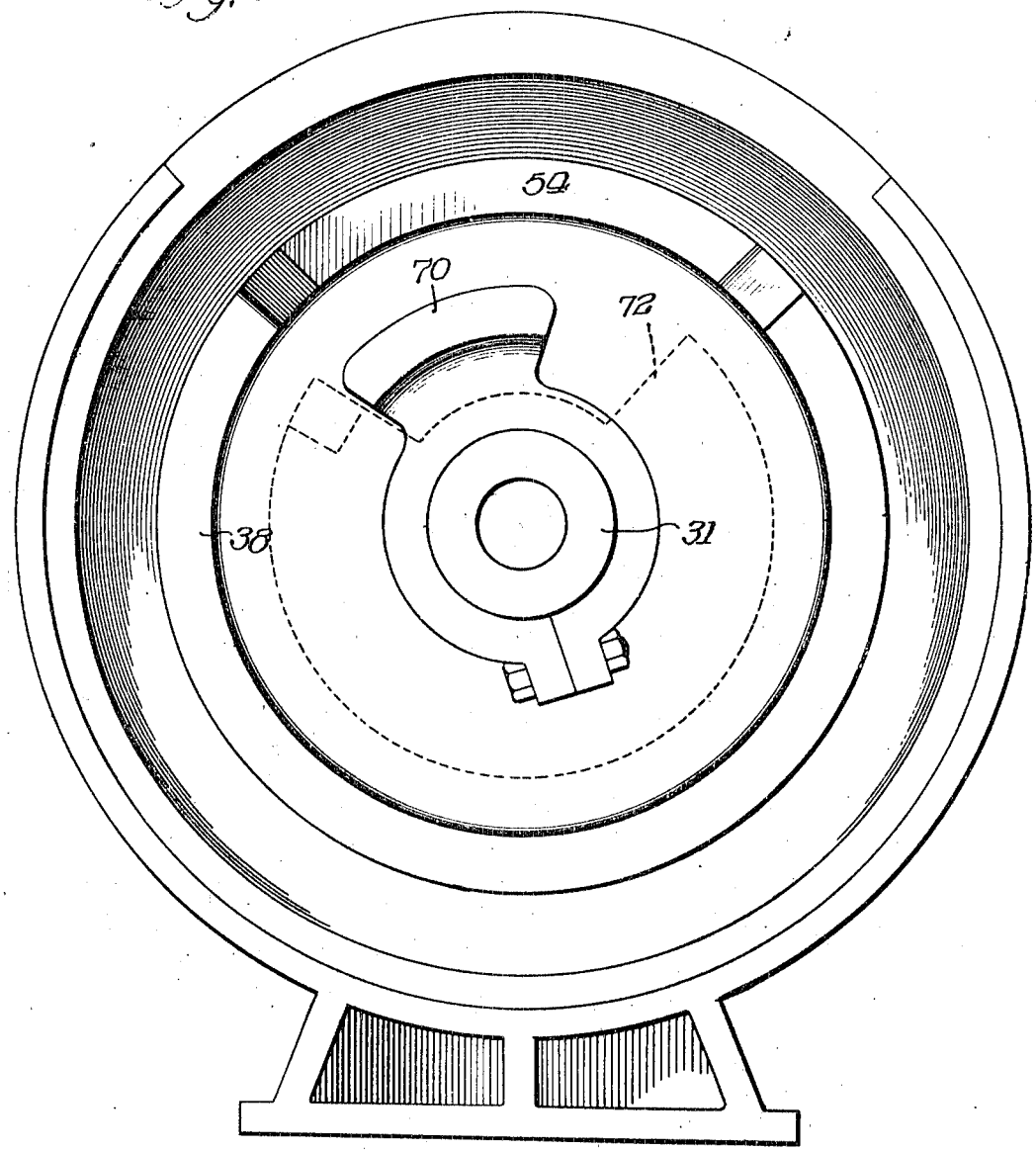

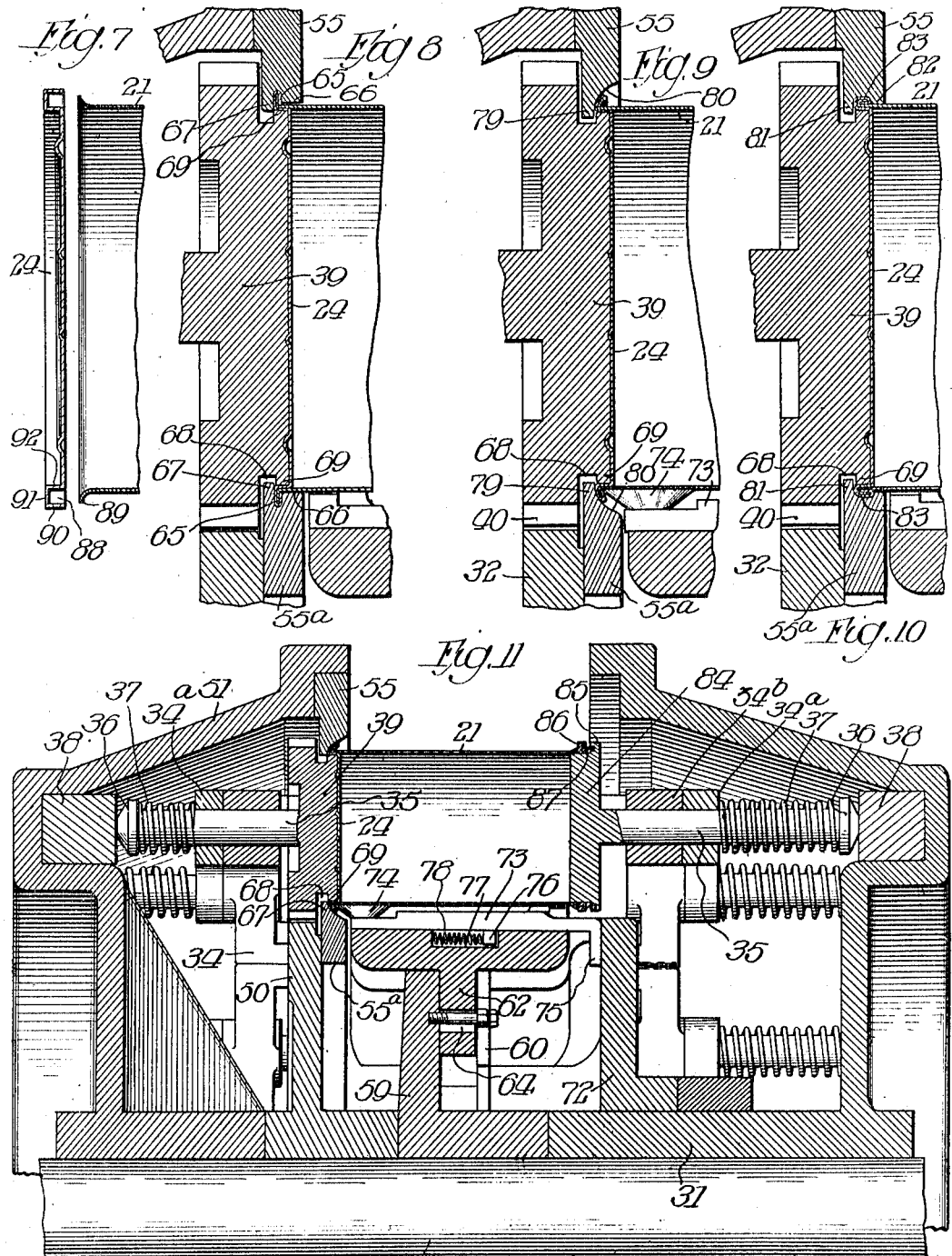

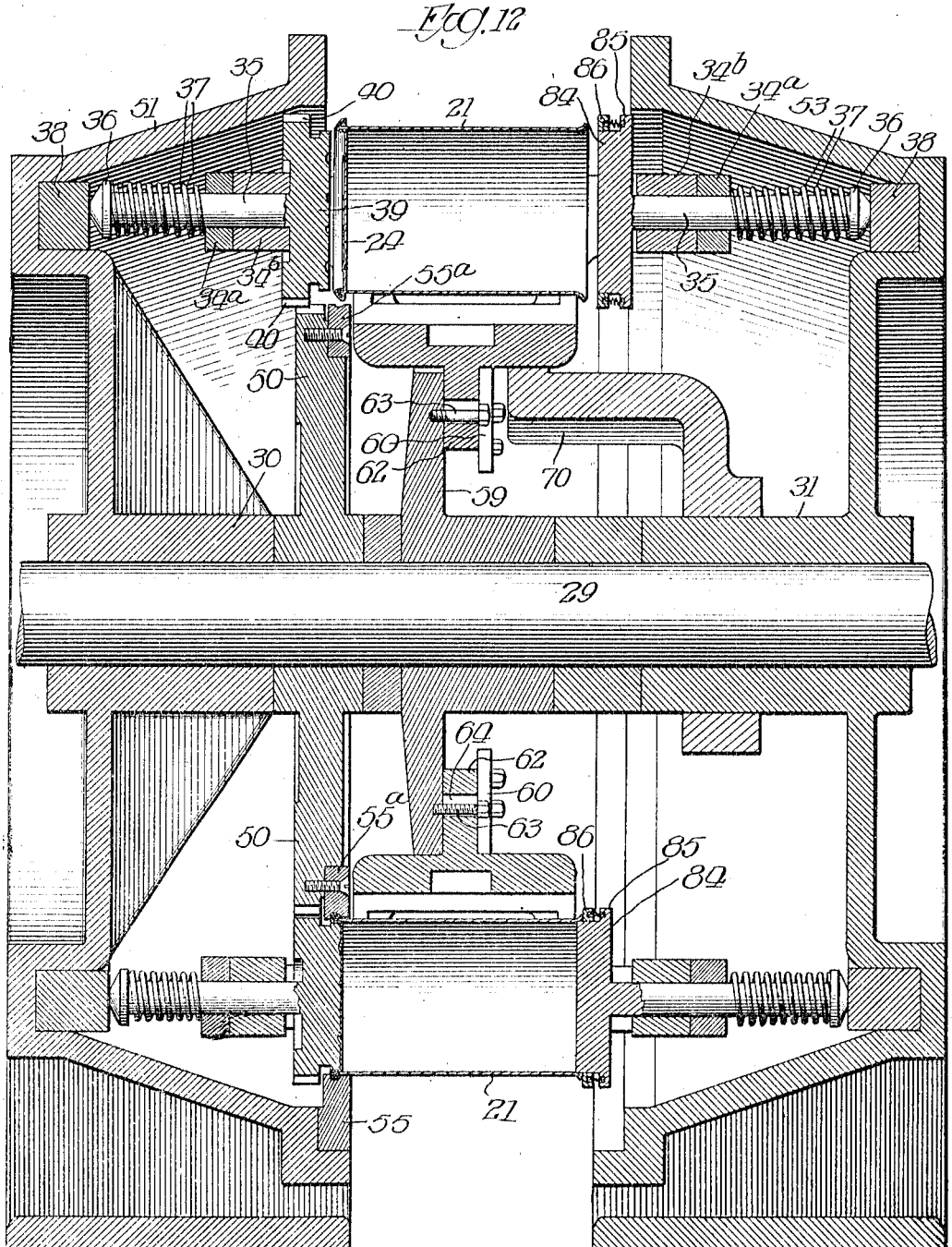

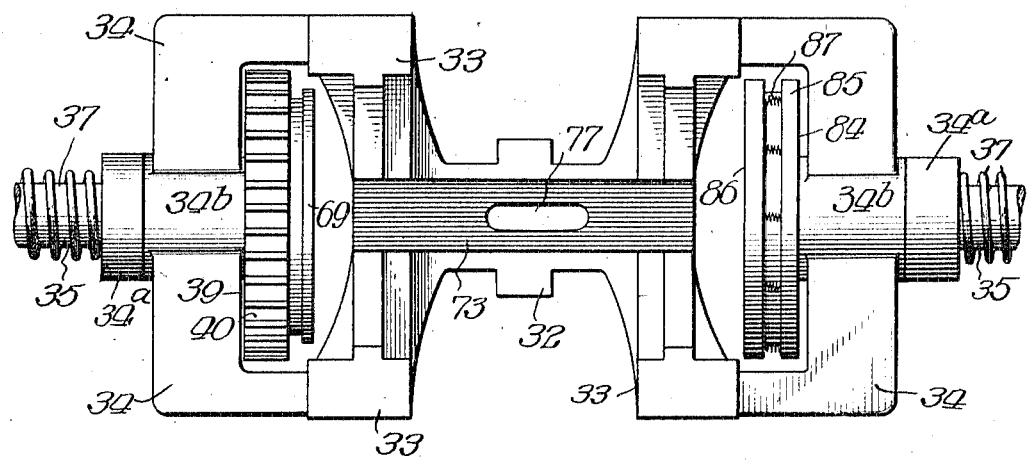
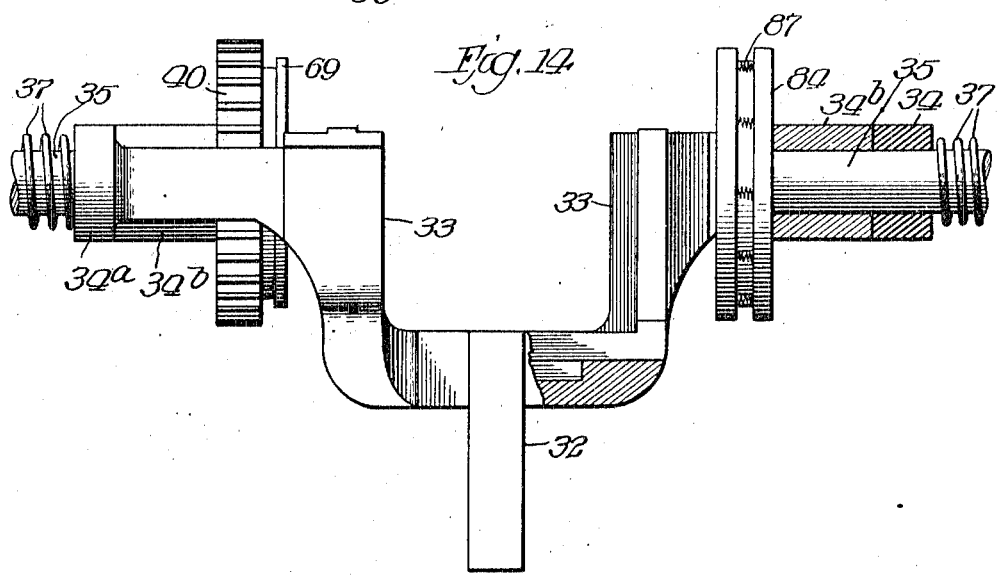

J. W. NICHOLS.
CAN SEAMING MACHINE.
APPLICATION FILED JAN. 30, 1913.
1,096,937.
Patented May 19, 1914.
9 SHEETS—SHEET 9.
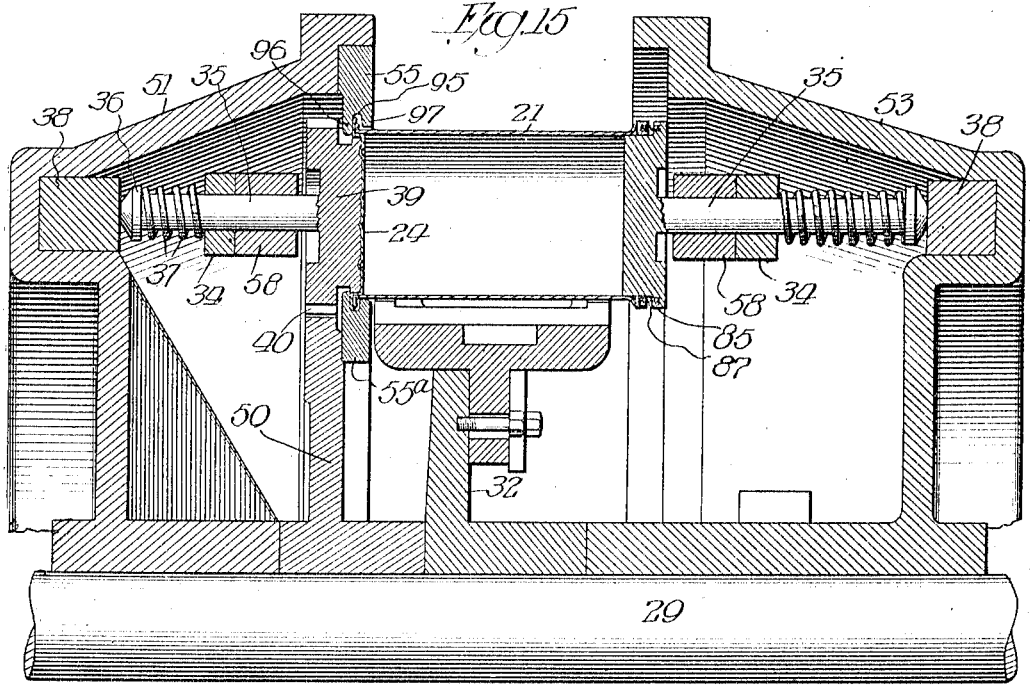
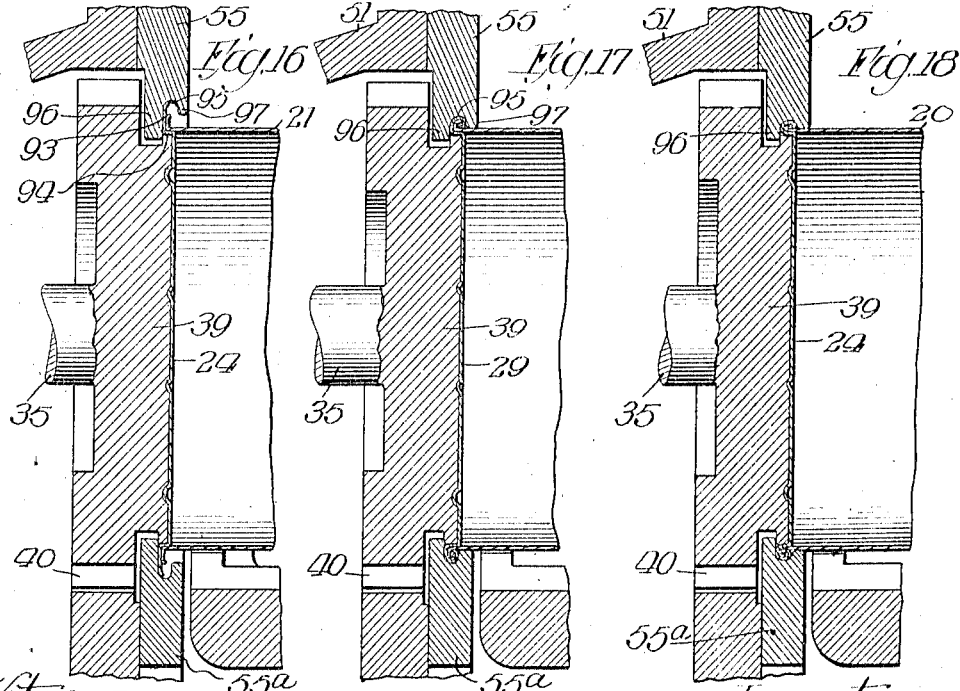

UNITED STATES PATENT OFFICE.

JESSE W. NICHOLS, OF CHICAGO, ILLINOIS.

CAN-SEAMING MACHINE.

1,096,937.  Specification of Letters Patent.  Patented May 19, 1914.

Application filed January 30, 1913. Serial No. 745,137.

*To all whom it may concern:*

Be it known that I, JESSE W. NICHOLS, a citizen of the United States, residing at Chicago, in the county of Cook and State of Illinois, have invented certain new and useful Improvements in Can-Seaming Machines, of which the following is a specification.

My invention relates to can seaming machines, and refers particularly, although not exclusively, to machines which are adapted to form flanges on the ends of round can bodies and to apply can caps to one or both of the ends of such bodies.

I am aware that heretofore machines have been used to form flanges on can bodies, and to unite the caps to such bodies. In some of the machines of the prior art means have been provided by which in a single machine a plurality of can bodies are simultaneously flanged.

It is the object of my invention to effect a saving of time and increase of production by providing a machine in which both the flanging and cap-applying operations are performed on a large number of can bodies simultaneously, the machine being so designed that before the flanging operation, for example, is completed on one can body it is started on another can body. This result is accomplished by means of various mechanism which will be described in detail hereafter.

Stated in general terms, my invention consists in using a plurality of separate machines, each machine performing one or more steps of the complete operation. The can bodies and caps are fed to these machines, and as the forming operations are accomplished the cans are automatically moved from one machine to another. Each machine is provided with a plurality of can carriers which are mounted on a rotatable shaft, and as this shaft is rotated the heads between which the cans are carried or clamped on each carrier are simultaneously rotated on their own axes, while the edges of the cans are brought into contact with suitable forming dies, which, in conjunction with the carrier head, perform the suitable operation on the can.

Figure 1:
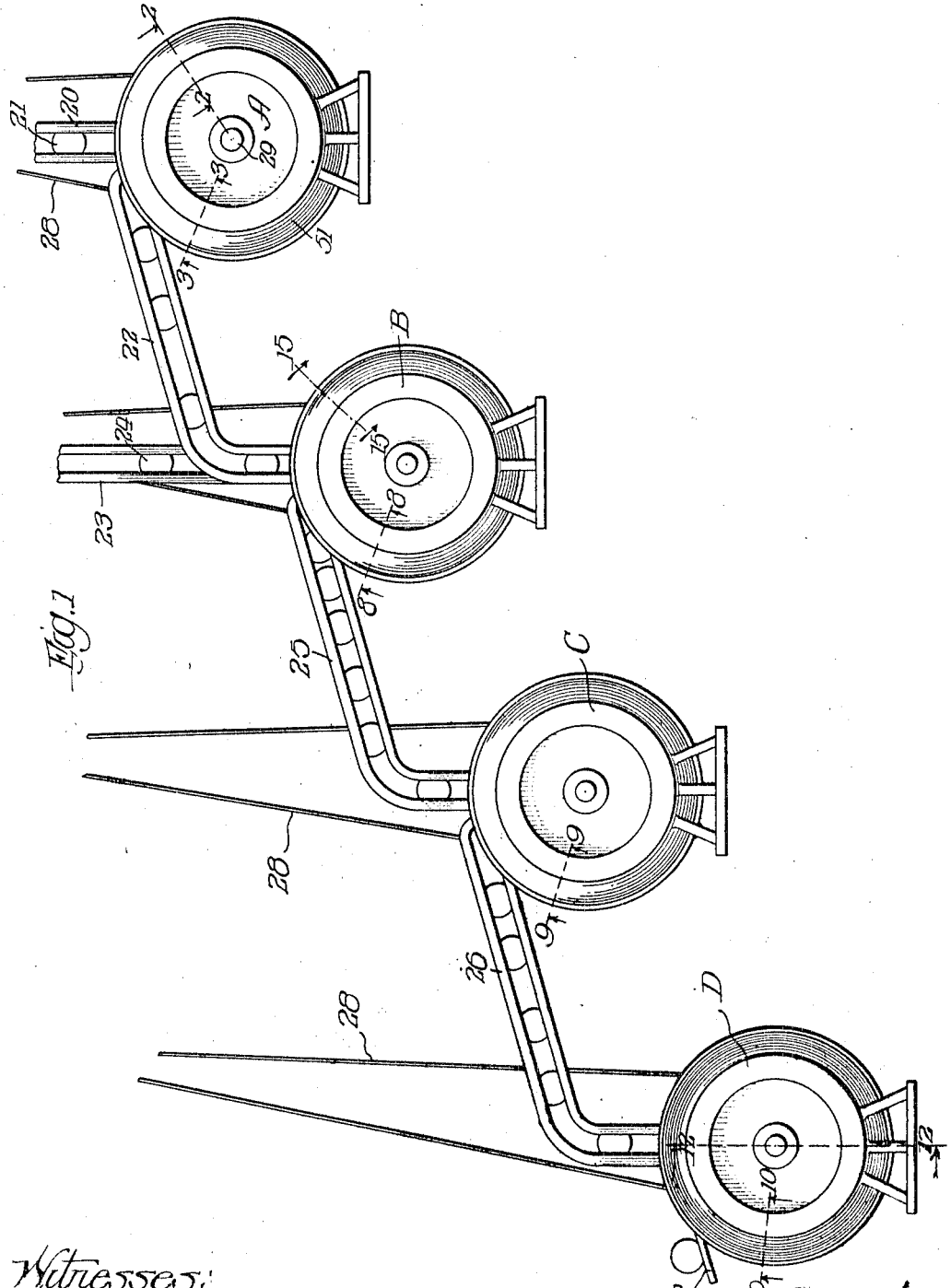
Figure 2:
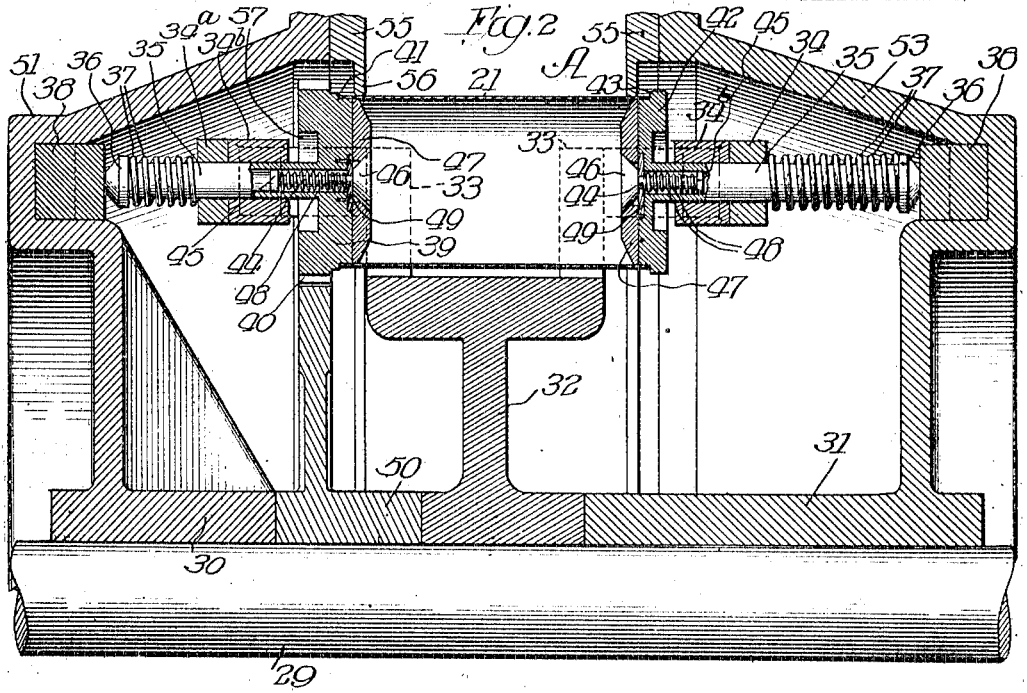
Figure 3:
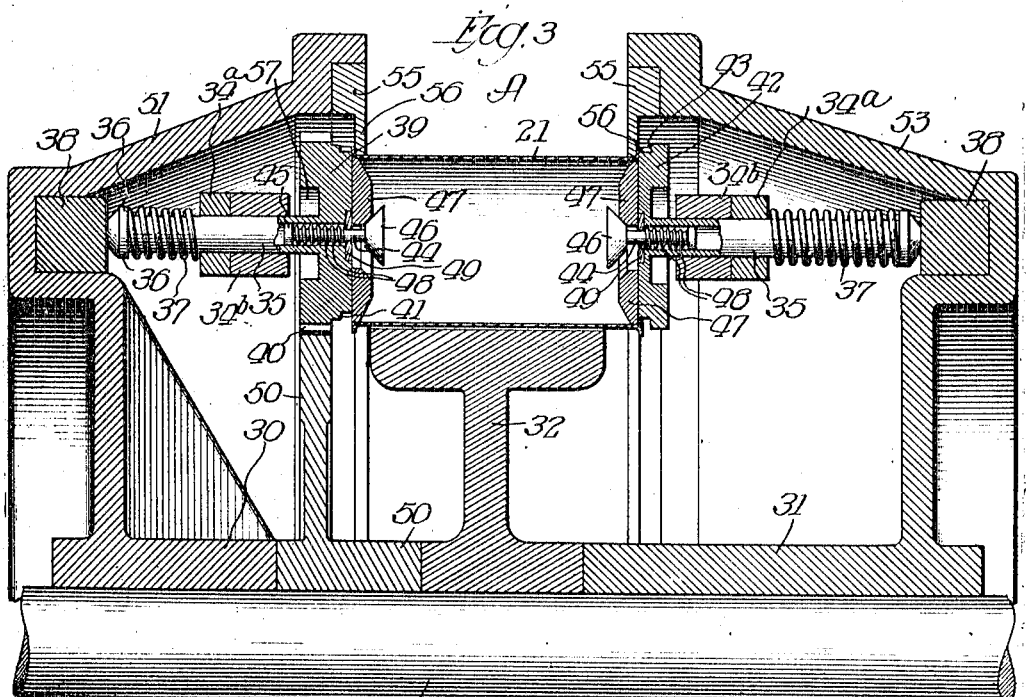

These and other advantages of my invention will be more readily understood by reference to the acompanying drawings, in which:

Figure 1 is a diagrammatic rear elevation of the can seaming machines, which, in conjunction, perform the complete flanging and cap-applying operations; Fig. 2 is an enlarged fragmentary section, taken on the line 2—2 of Fig. 1; Fig. 3 is an enlarged fragmentary section, taken on the line 3—3 of Fig. 1; Fig. 4 is a rear elevation of one of the can seaming machines shown in Fig. 1, a portion of the casing being removed to show the interior arrangement of parts; Fig. 5 is a front elevation of the machine shown in Fig. 4, the rear face of the casing being removed and certain of the parts being shown in vertical section; Fig. 6 is a rear elevation of the machine casing, the front wall of which has been removed; Fig. 7 is a vertical section through a portion of the flanged can body and the cap which is to be applied to the same; Fig. 8 is a fragmentary enlarged section, taken on the line 8—8 of Fig. 1; Fig. 9 is a fragmentary enlarged section, taken on the line 9—9 of Fig. 1; Fig. 10 is an enlarged fragmentary section, taken on the line 10—10 of Fig. 1; Fig. 11 is an enlarged section, taken on the line 9—9 of Fig. 1, being similar to Fig. 9 but showing a greater number of parts in position; Fig. 12 is an enlarged vertical section, taken on the line 12—12 of Fig. 1; Fig. 13 is a plan of one of the can carriers; Fig. 14 is a side elevation of the carrier shown in Fig. 13; Fig. 15 is a fragmentary section, taken on the line 15—15 of Fig. 1, but showing a modified construction of the former head and former dies of the seaming machine; Fig. 16 is an enlarged fragmentary section, taken on the line 15—15 of Fig. 1, but showing fewer parts than are shown in Fig. 15, and illustrating the form of the can and can cap more clearly than in Fig. 15; Fig. 17 is an enlarged fragmentary section of the modification shown in Fig. 15 and taken in the same position as Fig. 8 with relation to Fig. 1; and Fig. 18 is an enlarged fragmentary section of the modification shown in Fig. 15 and taken in the same position as Fig. 9 with relation to Fig. 1.

In performing the can-seaming operation I preferably use four machines, indicated as A, B, C and D, respectively, shown in Fig.

1. The machine A is provided with a hopper 20 through which the can bodies 21 are fed to the machine, and the chute 22 leads from the machine A to the machine B. The latter machine is also provided with a hopper 23 through which the can caps 24 are fed to the machine B. The chute 25 leads from the machine B to the machine C, and the chute 26 leads from the machine C to the machine D. The latter is provided with a delivery chute 27 from which the seamed cans are delivered. Each of the machines A, B, C and D is operated by a belt 28, or is driven in any other suitable manner.

As will be described in detail hereafter, the can bodies 21 are first flanged in the machine A, then pass through the chute 22 to the machine B. The can caps 24 are fed to this machine, and the first operation of fastening the caps to the can bodies is performed in this machine. The can bodies with their attached caps then pass through the chute 25 to the machine C, where a further seaming operation is performed, and they then pass through the chute 26 to the machine D, where the final seaming operation takes place. From this machine the finished seamed cans are delivered through the chute 27.

Having thus described the operation of my improved machines, I will now pass to a detailed description of the same. Each of the machines A, B, C and D is provided with a driving shaft 29, which is rotated by a belt 28, or in any other suitable manner. The shaft 29 is mounted in the bearings 30 and 31 of the front and rear walls of the casing with which each of the machines is provided.

In the case of the machine A the disk 32 is rigidly mounted on the shaft 29. The disk 32 has on its periphery a plurality of carriers, each of which consists of a pair of semi-circular yokes 33. The ends of each of these yokes are connected by the arms 34. Passing through each of the bearing blocks 34$^a$ and 34$^b$ of the arms 34 of each carrier is a hollow shaft 35 having a shouldered end 36. A spring 37 encircles the shaft 35 and bears on one end against the shouldered end 36 and on the other against the block 34$^a$, thereby normally forcing the shaft 35 in an outward direction so that the end of this shaft is brought in contact with the cam 38. The shafts 35 on one side of the machine, as clearly indicated in Figs. 2 and 3, are made integral with the former heads 39, the peripheries of which are suitably cut to form the pinions 40. The inner portion of each former head 39 is provided with a shoulder 41, against which one end of the can body 21 is adapted to come in contact. The opposite shafts 35 are made integral with the former heads 42 provided with the shoulders 43, against which the opposite end of the can bodies 21 come in contact. Each of the hollow shafts 35 has contained within its inner end a shaft 44 with a piston 45 on its inner end. The outer end of each of the shafts 44 is provided with an outwardly flaring or beveled head 46, which engages a corresponding beveled surface of the former plate 47. A spring 48 incloses the shaft 44 and bears on one end against the piston 45 and on the opposite end against the retainer plate 49, thereby normally carrying the shaft 44 inwardly within the hollow shaft 35 and bringing the former plate 47 into a central position with relation to the former head 39 or 42, as the case may be. The gear 50 is loosely mounted on the shaft 29, and is in mesh with each of the pinions 40, which are formed integral with the former heads 39. As clearly shown in Fig. 4, the rear wall 51 of the machine casing for each of the machines A, B, C and D is provided with a gear segment 52, which is at all times engaged by at least one of the pinions 40. It will be evident that as the shaft 29 is rotated and the disk 32, with its carriers, is correspondingly rotated, the pinions 40 which are in engagement with the gear segment 52, will be themselves rotated, and will transmit their movement to the gear 50, which, in turn, will serve to rotate all of the pinions 40 with which it is in mesh. The cam members 38, which are contained within the rear wall 51 and the front wall 53 of the casing of each machine, are of varying thickness, and have their ends located toward the upper part of each machine so that, as best shown in Fig. 6, a space 54 is formed between these ends. Each of the walls 51 and 53 of the casing of the machine A is provided with a former die 55 having an inwardly projecting lip 56. These former dies 55, as best shown in Fig. 5, pass only partially around the front and rear walls of the casing, and there is a space at the upper part of the machine between the ends of these former dies.

Having thus described the construction of the machine A, its operation may now be readily understood. As shown in Fig. 1, the can bodies 21 are fed to the machine A at its upper portion. Each of the can bodies is received in one of the carriers having the yokes 33, 33. On account of the fact that when any carrier is in position at the upper part of the machine the hollow shafts 35 are no longer in contact with the cams 38, the tension of the springs 37 causes the former heads 39 and 42 to be withdrawn out of the path of the descending can bodies until the bottoms of the recesses 57 engage the ends of the blocks 34$^b$. As the shaft 29 continues to rotate the ends of the hollow shafts 35 are brought into engagement with the cams 38, thereby moving the former heads 39 and 42 inwardly, and the ends of the can body are engaged by the beveled ends of the former plates 47, thereby raising the can body 21 slightly from the yokes 33, and causing the edges of the can body to engage the shoulders 41 and 43 of the former heads 39 and 42. When this operation takes place, the can body has been brought into operative engagement with the inner edges of the lips 56 of the former dies 55. The lips 56 gradually increase in length toward the shaft 29 throughout the extent of the former dies. As the former head 39 is rotated by its engagement with the gear 50, the edges of the can body 21 are gradually flanged as they come in contact with the lips 56 of the former dies 55. The position of the various parts when the can bodies are first brought in contact with the lips 56 is indicated in Fig. 2, and after a can body has been carried around the machine A to where the length of the lips 56 has become greater, it will be noticed that the edges of the can body 21 have been flanged by the coöperative action between the lips 56 and the former plates 47. The former plates, as indicated in Fig. 3, are adapted to move in a radial direction toward the shaft 29, and in doing so force outwardly the beveled heads 46 on the ends of the shafts 44 against the tension of the springs 48, thereby holding the peripheries of the former plates 47 in spring engagement with the edges of the can body 21. When one of the can bodies 21 has reached a position slightly beyond the line 3—3 of Fig. 1, the ends of the hollow shafts 35 are disengaged from the cams 38, thereby withdrawing the former heads 39 and 42. The can body 21 is then carried into the curved end of the chute 22 and passes to the machine B.

The machines B, C and D are, in many respects, identically constructed, and also have many features in common with machine A, which has previously been described. For example, each of these machines is provided with a casing having a rear wall 51 and a front wall 53, and has the cams 38, the gear 50, the gear segment 52, and a plurality of carriers, each of which is provided with a pinion 40. Instead of having the carriers consist of yokes which are directly carried by the disk 32, as in machine A, machines B, C and D are provided with a disk 59 to which are bolted the guides 60, as clearly shown in Figs. 5, 11 and 12. Each of the carriers, represented as a whole by 61, is provided with a lug 62, which is held in position by the engagement of the guides 60 against its outer face. A bolt 63 passes through the slot 64 in this lug so that the carrier 61 is enabled to be moved outwardly and inwardly away from and toward the shaft 29. Each of the carriers 61 is provided with yokes 33, the same as the yokes used in machine A. The two arms of each of these yokes are connected by the arm 34, on which is mounted the blocks 34$^a$ and 34$^b$. The former heads, which will be further described hereafter, are the same in principle as those illustrated in connection with machine A, but no former plates 47 with their associated parts are employed. Each of the machines B, C and D has an outer former die 55, and an inner former die 55$^a$, the latter being carried by the gear 50, but these dies are shaped in accordance with the particular requirements of the different machines.

The configuration of the various parts which are typical of machine B is indicated in Fig. 8. The former dies 55 and 55$^a$ are provided at their inner edges with a groove 65 between the shoulder 66 and the lip 67. The former head 39 of this machine has a groove 68 for receiving the lips 67 of the former dies 55 and 55$^a$, and is also provided with the peripheral projection 69. The surface of the inner end of the former head 39 is suitably formed to receive the can cap 24.

In machines B, C and D a cam 70 is permanently fastened in position on the casing of the machine. After the carriers have been rotated into a position in which the can bodies with their attached caps are ready to be delivered from the machines, the inner surface of each carrier is brought into contact with the outer edge of the cam 70, as clearly shown in Fig. 5, and the carrier is moved outwardly in a radial direction, this movement being allowed by the slot 64. In this way the can is more readily brought into engagement with the curved edge of the downwardly extending member 71 of the delivery chute 25 or 26, as the case may be, and the can is carried by this member 71 into the main portion of the chute. As the shaft 29 continues to rotate, the carriers are brought out of engagement with the cam 70 and again move toward the shaft 29 into their normal positions.

Machine C is provided with a cam 72 fastened to the bearing 31, as best indicated in Figs. 6 and 11. Each of the carriers 61 of this machine has a laterally movable bar 73 carrying at one end the beveled forming wheel 74, the opposite end of the bar 73 being bent to form the engaging member 75. The central portion of the bar 73 is provided with a lug 76 contained within the recess 77 of the carrier. This lug is engaged by the spring 78, the opposite end of which engages the end of the recess, thereby normally tending to move the bar 73 to the right, as indicated in Fig. 11. As indicated in Figs. 9 and 11, the former dies 55 and 55$^a$ of the machine C have the lips 79 and the curved surfaces 80, the object of which will presently be described. The former head 39 is of the same shape as the former head of machine B.

Machine D is similar to machine B in that its carriers are not provided with the bars 73 carrying the forming wheels 74, nor is it provided with the cam 72. The former dies 55 and 55ª of machine D have the lips 81, the shoulders 82, and the grooves 83, the purposes of which will presently be described.

As shown in Figs. 11 and 12, the retaining heads 84, which correspond to one set of former heads 42 in machine A, in machines B, C and D are merely for the purpose of holding one end of the can body in position. Each of these retaining heads 84 is provided with a flange 85 and a ring 86, between which and the flange 85 are springs 87. The former heads 39 of machines B, C and D are similar to those of machine A. The end of the can body engages the ring 86, which is resiliently held in position by the springs 87. If it is desired to apply can caps to both ends of the can body, it will be evident that the retaining heads 84 on the machines B, C and D may be replaced by the former heads, and on each machine additional former dies 55 and 55ª appropriately shaped may also be used.

Having thus described the various parts which I employ in my machines B, C and D, the operation of the same may now be readily understood: When one of the flanged can bodies enters the upper portion of the machine B through the chute 22, it is received in one of the carriers 61. At the same time a can cap 24 is fed into the carrier. When the latter is in its receiving position, the former head 39 and the retaining head 84 are in their withdrawn positions, in the same manner as previously described in connection with machine A. The can cap which I prefer to use in connection with my invention is formed as shown in Fig. 7. The can cap 24 has a groove 88 in its periphery, so that the flange 89 of the can body may be slipped into this groove.

As shown in Fig. 7, the groove 88 is bounded by the edge portion 90, the intermediate portion 91, and the flange portion 92. As the carrier 61 containing a can body and can cap is carried within the machine B, the ends of the shafts 35 are brought into engagement with the cams 38, and the former head 39 and the retaining head 84 are moved inwardly, so that the can cap is brought into engagement with the end of the can body, the flange 89 lying within the groove 88. The edges of the can body and can cap then engage the former dies 55 and 55ª, as indicated in Fig. 8, thereby turning the edge portion 90 of the can into a position in which it is parallel with the intermediate portion 91, the flange 89 of the can body being between the edge portion 90 and the intermediate portion 91 of the can cap. After the can body with its attached cap has been carried around the machine B, it is delivered through the chute 25 to the machine C, where the next forming operation takes place in exactly the same manner as described in connection with machine B, except that as previously mentioned the former dies 55 and 55ª are of different shape, and the edge portion 90 of the can cap is engaged by the edge of the forming wheel 74, so that the edge portion 90 of the can cap is forced snugly against the flange 89 of the can body. After this operation has been performed, the can body and its cap are next delivered to the machine D, where the former dies 55 and 55ª are of a still different shape, as indicated in Fig. 10, and serve to fold the edge portion 90, the flange 89, and the intermediate portion 91 into a plane parallel with the main axis of the can body. The seaming operation has now been completed, and the finished can body, with its attached cap, is delivered through the delivery chute 27.

In Figs. 15, 16, 17 and 18 I have shown slightly modified forms of machines for attaching the can cap to the can body after the can body has been flanged in the machine A. The can cap, as clearly shown in Fig. 16, has a flange 93 around its periphery, this flange being connected with the main portion of the can cap by the offset 94. In the machine B the former dies 55 and 55ª in that portion of the machine where these dies are first engaged by the can cap and can body are formed, as indicated in Fig. 16, with a curved surface 95 between the lips 96 and 97. The lips 97 of the former dies 55 and 55ª gradually increase in length, so that as the can body and the can cap are carried around in the machine B the flange 96 of the can cap is gradually folded around the flange 89 of the can body, until we have the condition indicated in Fig. 17. The can body with its attached can cap is now delivered to machine C, where the former dies 55 and 55ª are so formed that this folding operation is completed, and the can cap is finally attached to the can body in the manner indicated in Fig. 18. From machine C the can bodies with their attached caps are delivered to the final delivery chute, the machine D being eliminated.

It will be apparent to those skilled in the art that many changes could be made in the detailed mechanism of the machines which I have described without departing from the spirit or scope of my invention.

What I claim is:

1. In a can-shaping machine, the combination of a casing, a rotatable shaft within said casing, a plurality of carriers mounted on said shaft, each of said carriers adapted to receive a can body, a former die attached to said casing, said die adapted to be engaged by said can bodies during the rotation of said shaft, and means for moving each of said carriers radially away from said shaft when said carrier reaches a predetermined position in said machine, substantially as described.

2. In a can-seaming machine, the combination of a rotatable shaft, a carrier mounted on said shaft, means for feeding a can body and can cap to said carrier, means for rotating said can body on its own axis, a former die with which the can and its cap are engaged by rotation of said shaft, whereby the edges of the can body and can cap are folded about each other, and a forming wheel on said carrier for forcing the edges of said can and said can cap into close engagement with each other, substantially as described.

3. In a can seaming machine, the combination of a rotatable shaft, a carrier mounted on said shaft, means for feeding a can body and can cap to said carrier, means for rotating said can body on its own axis, a former die with which the can and its cap are engaged by rotation of said shaft, whereby the edges of the can body and can cap are folded about each other, a forming wheel on said carrier for forcing the edges of said can and said cap in close engagement with each other, and cam means for controlling the movement of said forming wheel, substantially as described.

4. In a can seaming machine, the combination of a rotatable shaft, a carrier mounted on said shaft, means for feeding a can body and can cap to said carrier, means for rotating said can body on its own axis, a former die with which the can and its cap are engaged by rotation of said shaft, whereby the edges of the can body and can cap are folded about each other, a forming wheel on said carrier for forcing the edges of said can and said cap in close engagement with each other, spring means for normally moving said forming wheel away from the folded edges of said can and said can cap, and cam means for moving said forming wheel toward said interfolded edges, substantially as described.

JESSE W. NICHOLS.

Witnesses:
   A. B. STRATTON,
   O. LAAGE, Jr.

Copies of this patent may be obtained for five cents each, by addressing the "Commissioner of Patents, Washington, D. C."